United States Patent [19]

Yukihiro et al.

[11] Patent Number: 5,183,621
[45] Date of Patent: Feb. 2, 1993

[54] METHOD OF BOTH SINGLE AND DOUBLE INJECTION MOLDING

[75] Inventors: Makoto Yukihiro; Mamoru Katagiri, both of Hiroshima, Japan

[73] Assignees: The Japan Steel Works, Ltd., Tokyo; Matsushita Electric Industrial Co., Ltd., Osaka, both of Japan

[21] Appl. No.: 655,497

[22] Filed: Feb. 14, 1991

[51] Int. Cl.$^5$ .............. B29B 11/08; C29C 45/07; C29C 45/10

[52] U.S. Cl. .............. 264/297.2; 264/328.8; 264/328.11; 425/572; 425/574; 425/588

[58] Field of Search ............ 264/255, 257, 260, 294, 264/328.8, 328.11, 328.12, 297.2; 425/572, 574, 575, 588

[56] References Cited

U.S. PATENT DOCUMENTS 4,588,365  5/1986  Holzschuh ............ 264/328.8
5,052,915  10/1991 Schad et al. ............ 264/328.8

Primary Examiner—Jan H. Silbaugh
Assistant Examiner—A. Y. Ortiz
Attorney, Agent, or Firm—Sughrue, Mion, Zinn, Macpeak & Seas

[57] ABSTRACT

Single and double injection molding using a single molding machine is made possible by providing two injection units, each having an injection nozzle, and a stationary platen three insertion holes into which the nozzles can fit. For double injection, the injection units are moved transversely of the stationary platen so as to orient both injection nozzles with a respective one of the insertion holes. For single injection, the injection units again are moved transversely of the stationary platen so as to orient one of the injection nozzles with one of the insertion holes, with the other nozzle not being so oriented.

1 Claim, 3 Drawing Sheets

METHOD OF BOTH SINGLE AND DOUBLE INJECTION MOLDING

BACKGROUND OF THE INVENTION

The present invention relates to a method of double injection molding and to a machine therefor, in which both single injection molding and double injection molding can be performed by the same machine.

One known two-color injection molding machine includes two injection units by which two molten synthetic resins are injected sequentially into dies tightened on each other by a single clamping unit and having a single gate.

To manufacture separately two molded products from different material or having two different colors, the products are molded by two molding machines.

Since the two-color injection molding machine does not include a unit for moving the two injection units transversely in the direction of the width of the bed of the machine, the machine can be used only for the dies having the corresponding gate position, but cannot used for other dies which are positioned differently. For that reason, the machine has a limited range of utility, thus increasing the cost of the equipment.

Where two molded products, having different colors or being made of different materials, are manufactured separately by two molding machines, there is a problem in that the cost of control of the number of the manufactured products and the cost of the equipment are high.

SUMMARY OF THE INVENTION

In view of the foregoing, it is an object of the present invention to provide a method of double injection molding and a machine therefor, in which single injection molding also can be performed. A single clamping unit and two injection units are prepared so that double injection molding can be performed by using both of the injection units and dies which have two lateral gates, and by which molded products can be manufactured separately. Single injection molding can be performed by using one of the injection units and dies having a single central gate.

In the double injection molding method provided in accordance with the present invention, a unit is moved transversely parallel to a stationary platen having three nozzle insertion holes at equal intervals in a row horizontally, so that the two injection units provided parallel to each other on support members which are part of the transverse moving unit are moved and positioned in a double molding position, in which the nozzles of the injection units are oriented to the two lateral nozzle insertion holes; double injection molding is performed thereafter; the transverse moving unit is moved transversely parallel to the stationary platen so that the injection units are moved and positioned in a single injection molding position in which the nozzle of one of the injection units is oriented to the central nozzle insertion hole; and single injection molding is performed thereafter.

The double injection molding machine provided in accordance with the present invention includes the three nozzle insertion holes provided in the stationary platen of the clamping unit so that the holes are located at the equal intervals in the horizontal row; the transverse moving unit which is transversely moved in parallel with the stationary platen; the two injection units provided parallel to each other on the support members provided on the transverse moving unit; drive means provided for the transverse moving unit so as to move the unit to the double injection molding position, in which the nozzles of the injection units are oriented to the two lateral nozzle insertion holes, or to the single injection molding position, in which the nozzle of one of the injection units is oriented to the central nozzle insertion hole; and a positioning mechanism provided for the transverse moving unit so as to position it in either of the double and the single injection molding positions.

According to a particularly preferred embodiment, the support members are constituted by two swing bearers provided parallel to each other on a swing plate which is coupled pivotally to the transverse moving unit, thus yielding superior operation.

In each of the method and the machine which are provided in accordance with the present invention, the two injection units are moved back on the support members so that a prescribed distance is set between the stationary platen and the tip of each of the nozzles of the injection units. The transverse moving unit then is translated or moved transversely back or forth in the direction of the width of the bed of the machine, so that the injection units are moved and positioned in the double injection molding position, in which the nozzles of the injection units are oriented to the two lateral nozzle insertion holes of the stationary platen. Thereafter, the injection units are moved forth so that the nozzles thereof are inserted into the two lateral nozzle insertion holes. After that, molten synthetic resins are injected from the two injection units into the dies so that the double injection molding is performed.

When single injection molding is to be performed, the transverse moving unit is moved transversely as the two injection units remain moved back on the support members, so that one of the injection units is moved and positioned in the single injection molding position in which the nozzle of the positioned injection unit is oriented to the central nozzle insertion hole of the stationary platen. The positioned injection unit then is moved forward so that the nozzle thereof is inserted into the central nozzle insertion hole. After that, a molten synthetic resin is injected from the forwardly-moved injection unit into the dies to perform single injection molding. During single injection molding, the other injection unit is located in a lateral position in the direction of the width of the bed, and so is not used for molding. For that reason, the unused injection unit can be subjected to purging, automatic flushing or the like during the single injection molding.

DETAILED DESCRIPTION OF THE PREFERRED EMBODIMENT

Figure 1:
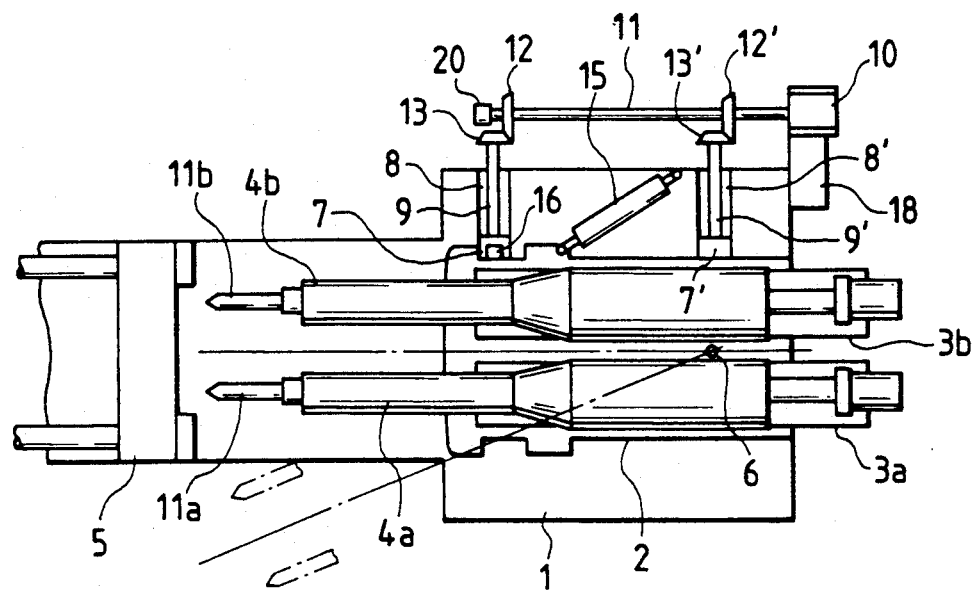
FIG. 1 is a cutaway plan view of a double injection molding machine according to one embodiment of the present invention.
Figure 2:
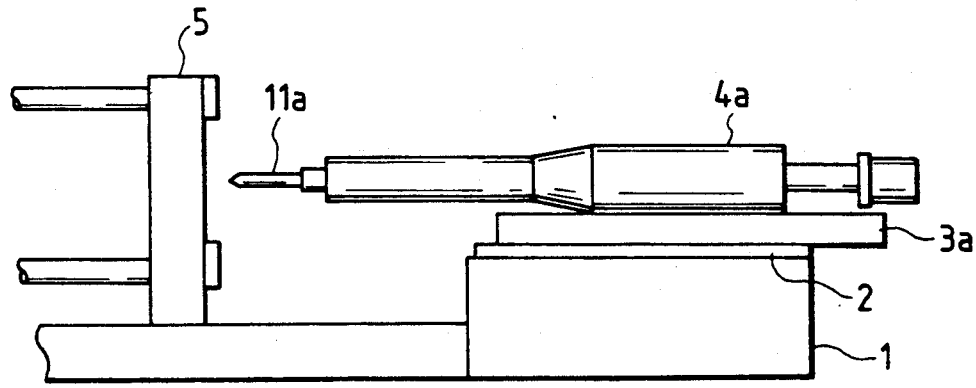
FIG. 2 is a side view of the machine.

As shown in FIGS. 1 and 2, a stationary platen 5 of a clamping unit (not completely shown in the drawings) is provided on the front portion (which is the left-hand portion in FIGS. 1 and 2) of a bed 1 of an injection molding machine which is one of the embodiments. The upper portion of the bed 1 has a front guide groove 8 and a rear guide groove 8' (which are located at the right-hand side of the secured plate 5 in FIG. 1) and extend parallel to each other in the direction of the width of the bed. A front slider 7 is fitted slidably in the front guide groove 8, and a rear slider 7' is fitted slidably in the rear guide groove 8'. A swing plate 2 is provided on the front and rear sliders 7 and 7', and is coupled pivotally to the rear slider by a pivot pin 6 projecting from the slider, so that the swing plate can be swung about the pin by a fluid pressure cylinder 15 provided in an appropriate place. The swing of the swing plate 2 ranges from one of the one-dot chain lines shown in FIG. 1 to the other.

Two swing bearers 3a and 3b are secured to the top of the swing plate 2 and extend parallel to each other. A first injection unit 4a is provided on the swing bearer 3a so that the injection unit can be slid back and forth by an appropriate device. A second injection unit 4b is provided on the other swing bearer 3b so that the injection unit can be slid back and forth by another appropriate device.

Figure 3:
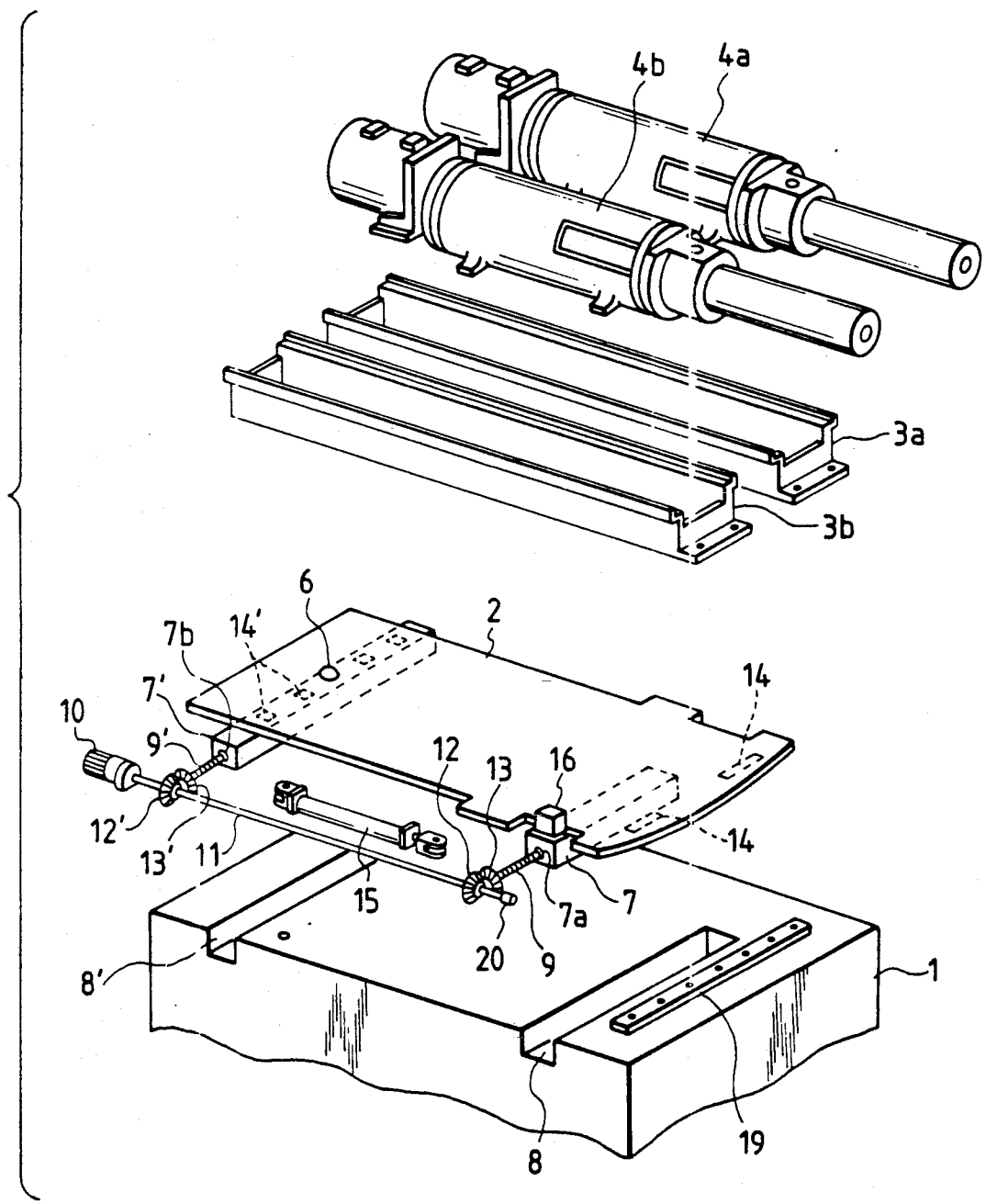
FIG. 3 is a perspective exploded view of a main part of the machine.

A driver for moving the moving unit of the injection molding machine transversely is constituted as now will be described. As shown in FIG. 3, the front and the rear sliders 7 and 7' have screw shaft holes 7a and 7b into which front and rear screw shafts 9 and 9' are screwed respectively. One end of each of the front and the rear screw shafts 9 and 9' is coupled rotatably to the bed 1. The other ends of the shafts are fitted with bevel gears 13 and 13' engaged with bevel gears 12 and 12' provided on a rotary shaft 11 coupled directly to a motor 10. The motor 10 is supported by a support frame 18 projecting from the bed 1, and functions to move the moving unit transversely.

When the motor 10 is actuated, the front and rear screw shafts 9 and 9' are rotated synchronously so that the front and the rear sliders 7 and 7' are slid parallel to each other in the direction of the width of the bed 1 at the same speed in the front and the rear guide grooves 8 and 8'. At that time, the motor 10 can be rotated either forward or backward to rotate the front and the rear screw shafts 9 and 9' forward or backward to move the front and the rear sliders 7 and 7' forth or back at the same speed parallel to each other in the direction of the width of the bed 1. A rotary encoder 20 is provided on the rotary shaft 11 at the end thereof opposite the motor 10 so as to control the motor. Since the front and the rear sliders 7 and 7' thus are moved transversely, the first and second injection units 4a and 4b also are moved transversely relative to the stationary platen 5.

As shown in FIG. 3, a plurality of rear sliding shoes 14' are embedded in the top of the rear slider 7' so as to enable the smooth swing of the swing plate 2. A plurality of front sliding shoes 14 are embedded in the bottom of the front portion of the swing plate 2 and positioned so that the shoes slide on the bed 1. A sliding rail 19 for guiding the swing of the swing plate 2 is provided on the bed 1 and located in a position corresponding to those of the front sliding shoes 14, to increase the stability of the swing plate at the time of the swing thereof. A coupling mechanism (not shown) is provided to couple the swing plate 2 and the front slider 7 to each other to move them together transversely, or to uncouple them from each other to swing only the swing plate.

Figure 4:
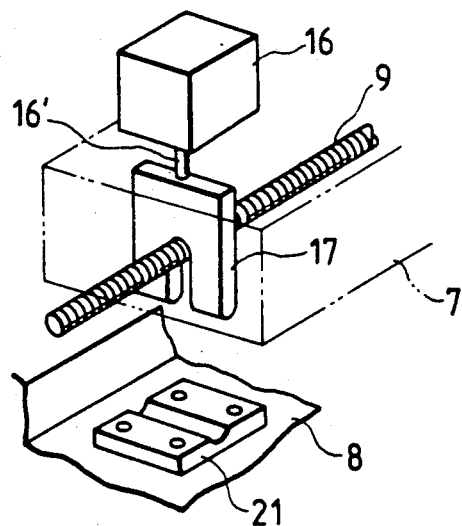
FIG. 4 is a perspective exploded view of the positioning mechanism of the machine.

FIG. 4 shows a positioning mechanism provided at the end of the front slider 7 nearer the rotary shaft 11. The positioning mechanism includes a positioning metal portion 17 supported slidably by the front slider 7 so as to be moved up and down by a piston rod 16' of a pneumatic cylinder 16, and three stop metal portions 21 (one being shown in FIG. 4) secured to the bottom of the front guide groove 8 and corresponding to three molding positions described hereinafter. When the pneumatic cylinder 16 is actuated, the positioning metal portion 17 is moved down so that it is engaged with one of the three stop metal portions 21 so as to keep the transverse moving unit in one of the three molding positions which are a double injection molding position and two single injection molding positions located on either side of the double injection molding position.

Although the transverse moving unit includes the front and the rear sliders 7 and 7' fitted movably in the front and rear guide grooves 8 and 8' of the bed 1, and also includes the swing plate 2 pivotally coupled as a support structure for the rear slider 7' by the pivot pin 6, in the embodiment described above, the unit is not so restricted in construction, but otherwise may be constituted to include a support plate provided instead of the swing plate and secured to the front and the rear sliders.

Figure 5:
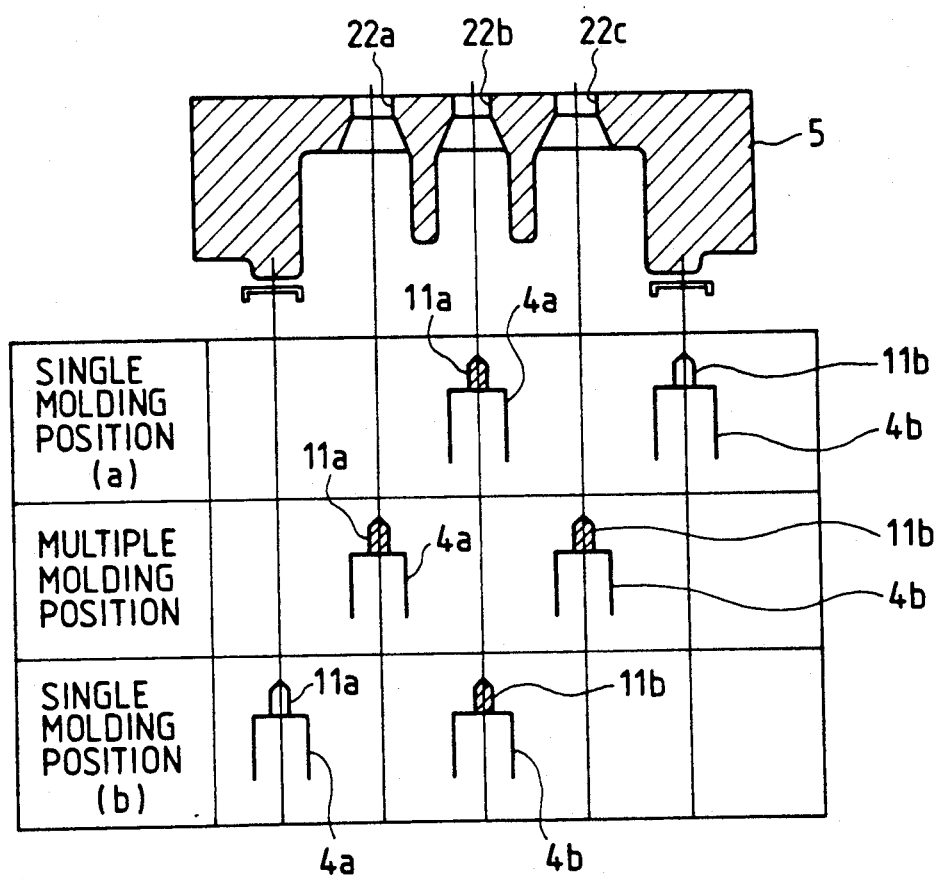
FIG. 5 is a plan view indicating the molding positions of the machine and the positions of the injection units thereof.

The transverse movement of the moving unit to the double and the single injection molding positions, in each of which molding is performed by the injection molding machine, now will be described. The transverse moving unit can be moved to the double injection molding position in which the nozzles 11a and 11b of the first and the second injection units 4a and 4b are oriented to the two lateral nozzle insertion holes 22a and 22c of the stationary platen 5. The moving unit also may be moved to a first single injection molding position, in which the nozzle 11a of the first injection unit 4a is oriented to the central nozzle insertion hole 22b of the stationary platen 5, or a second single injection molding position, in which the nozzle 11b of the second injection unit 4b is oriented to the central nozzle insertion hole 22b of the stationary platen 5, as shown in FIG. 5. After the moving unit is moved to a molding position, the unit is held there by a positioning mechanism.

To control the positioning mechanism, the position of the swing plate 2 is detected by the rotary encoder 20 or by limit switches (not shown), and the pneumatic cylinder 16 is actuated in response to a detection signal from the encoder or the limit switches. If the motor 10 for transverse movement of the moving unit is provided with a brake, the rotation of the motor can be stopped instantly so as not to rotate the front and the rear screw shafts 9 and 9', to move and stop the injection units 4a and 4b precisely in the molding positions in cooperation with the setting of the positioning mechanism.

The steps of an injection molding method to be practiced with the injection molding machine in accordance with the invention now will be described. As the first injection unit 4a on the swing bearer 3a and the second injection unit 4b on the other swing bearer 3b remain moved back, the moving unit is moved transversely to the double injection molding position in which the nozzles 11a and 11b of the first and the second injection units are oriented to the two lateral nozzle insertion holes 22a and 22c of the stationary platen 5, as shown in FIG. 5. The pneumatic cylinder 16 shown in FIG. 4 then is actuated so that the positioning metal portion 17 is moved down and the tip thereof is engaged in the corresponding stop metal portion 21 to position the transverse moving unit. The first and second injection units 4a and 4b are moved forward thereafter on the swing bearers 3a and 3b so that the nozzles 11a and 11b of the injection units are inserted into the two lateral nozzle insertion holes 22a and 22c. After that, molten synthetic resins are injected from the first and second injection units 4a and 4b into dies having two gates. Double injection molding thus is performed by the injection molding machine.

As the first and the second injection units 4a and 4b remain moved back, the moving unit is moved transversely to one single injection molding position in which the nozzle 11a of the first injection unit 4a or the nozzle 11b of the second injection unit 4b is oriented to the central nozzle insertion hole 22b of the stationary platen 5, as shown in FIG. 5. The pneumatic cylinder 16 then is actuated so that the positioning metal portion 17 is moved down and the tip thereof is engaged in the corresponding stop metal portion 21 to position the moving unit. The first or second injection unit 4a or 4b having its nozzle 11a or 11b oriented to the central nozzle insertion hole 22b then is moved forward so that the nozzle is inserted into the hole. Molten synthetic resin thereafter is injected from the injection unit into dies having a gate. Single injection molding thus is performed by the injection molding machine.

In an injection molding method provided in accordance with the present invention, first and second injection units are moved and positioned in a double injection molding position in which the nozzles of the injection units are oriented to the two lateral nozzle insertion holes of a stationary platen, and double injection molding is performed thereafter. It also is possible that, in the inventive method, the first and second injection units are moved and positioned in a single injection molding position in which the nozzle of one of the injection units is oriented to the central nozzle insertion hole of the stationary platen, and single injection molding is performed thereafter. During single injection molding, the injection unit not used therefor can be subjected to purging, flushing or the like, to greatly shorten the time of preparation for a color change or material change, and can be subjected to maintenance work without downtime.

In addition to the foregoing, a double injection molding machine provided in accordance with the present invention has the further desirable effect that the first and second injection units of the machine can be moved easily and positioned in either of a double injection molding position and a single injection molding position.

In addition, a double injection molding machine provided in accordance with the present invention has a desirable effect in that a swing bearer can be swung in either of a double injection molding position and a single injection molding position so as to perform fine adjustment by which the nozzles of the first and second injection units of the machine are aligned to the nozzle insertion holes of the stationary platen of the machine.

While the invention has been described in detail above with reference to a preferred embodiment, various modifications within the scope and spirit of the invention will be apparent to people of working skill in this technological field. Thus, the invention should be considered as limited only by the scope of the appended claims.

What is claimed is:

1. A method of performing single and double injection molding, comprising:

moving a transverse moving unit in a transverse direction parallel to a stationary platen having three laterally positioned nozzle insertion holes at equal intervals in a horizontal rod, so that two injection units provided parallel to each other and slidably supported on support members fixedly attached to said moving unit are moved and positioned in a double injection molding position in which nozzles of said injection units are oriented to two outer ones of the lateral nozzle insertion holes;

performing double injection using both of said injection units;

moving said moving unit transversely parallel to said stationary platen so that said injection units are moved and positioned in a single injection molding position in which the nozzle of either one of said injection units is oriented to a middle one of the three nozzle insertion holes and in which the other of said injection units is positioned laterally of said three nozzle insertion holes; and performing single injection molding thereafter using said either one of said injection units.

* * * * *